United States Patent [19]

Calmanti et al.

[11] 4,360,439

[45] Nov. 23, 1982

[54] COMPOSITION FOR THE DE-INKING OF PRINTED WASTE PAPER BY THE WASHING PROCESS

[75] Inventors: Giulio Calmanti; Salvatore Gafa, both of Milan; Giovanni M. Dadea, Tradate; Alfonso Gatti, Novi Ligure; Fulvio Burzio, Milan, all of Italy

[73] Assignee: Montedison S.p.A., Italy

[21] Appl. No.: 140,481

[22] Filed: Apr. 15, 1980

Related U.S. Application Data

[63] Continuation-in-part of Ser. No. 952,210, Oct. 17, 1978, Pat. No. 4,231,841.

[30] Foreign Application Priority Data

Oct. 20, 1977 [IT] Italy .............................. 28816 A/77
Sep. 1, 1978 [IT] Italy .............................. 27242 A/78

[51] Int. Cl.$^3$ .......................... C09D 9/00; C09D 9/04; C09K 3/00; D21C 5/02
[52] U.S. Cl. ........................................ 252/61; 162/5; 162/8; 252/60; 252/109
[58] Field of Search .............................. 162/5, 6, 7, 8; 252/108, 109, 121, 132, 1, 60, 61

[56] References Cited

U.S. PATENT DOCUMENTS

| | | | |
|---|---|---|---|
| 3,377,234 | 4/1968 | Illingworth | 162/5 |
| 3,446,696 | 5/1969 | Illingworth | 162/5 |
| 3,764,460 | 10/1973 | Miyamoto | 162/5 |
| 3,826,749 | 7/1974 | Demangeon | 252/121 |
| 3,862,049 | 1/1975 | McGrath | 252/108 |
| 4,013,505 | 3/1977 | Balcar | 162/5 |
| 4,231,841 | 11/1980 | Calmanti | 162/5 |

*Primary Examiner*—Dennis L. Albrecht
*Attorney, Agent, or Firm*—Stevens, Davis, Miller & Mosher

[57] ABSTRACT

A printed waste paper de-inking composition for use in the "washing" process is disclosed containing:

(A) a salt of a fatty acid present in an amount of between 15% and 32% based upon the weight of the entire composition;

(B) a nonionic ethoxylated and/or propoxylated surfactant present in an amount between 5% and 25% based upon the weight of the entire composition;

(C) an anionic surfactant represented by sulphonates or sulphates present in an amount of between 2% and 8% based upon the weight of the entire composition;

(D) a sodium carboxylmethylcellulose in an amount of between 1% and 5% based upon the weight of the entire composition; and (E) an alkaline inorganic salt of the group comprising metasilicate, disilicate, carbonate, borate and polyphosphates, the alkaline inorganic salt present in an amount of between 30% and 80% based upon the weight of the entire composition; the percentages of the components (A), (B), (C), (D), and (E) totaling essentially 100%

An improved "washing" process for de-inking printed waste paper is also disclosed.

6 Claims, No Drawings

COMPOSITION FOR THE DE-INKING OF PRINTED WASTE PAPER BY THE WASHING PROCESS

CROSS-REFERENCE TO RELATED APPLICATIONS

This is a continuation-in-part of copending application Ser. No. 952,200 filed Oct. 17, 1978, now U.S. Pat. No. 4,231,841.

BACKGROUND OF THE INVENTION

1. Field of the Invention

The present invention relates to a composition for the de-inking of printed waste paper by the "washing" process. The de-inking of printed waste paper is intended to remove printing ink from paper and to recover a paper pulp that may be used to prepare printing paper for newspapers, magazines, books, etc. The printing paper consists essentially of cellulose fibers and fillers, while the printing ink consists of pigments held together by suitable vehicles.

2. Description of the Prior Art

One of the best known de-inking processes is the so-called "washing" process. In this process, the printed waste paper is prepared in water and the resulting suspension is successively washed.

During pulping of the printed waste paper in water, the printed waste paper is crushed and fiberized in an alkaline medium, with the aid of heat, mechanical stirring, and suitable de-inking compositions which remove the ink more or less thoroughly from the paper fibers.

The washing involves a series of thickenings and dilutions of the aqueous solution obtained from the waste water pulping and is designed to result in the formation of two aqueous suspensions: a more dilute suspension containing the possibly greatest quantity of the ink, and a thicker suspension containing paper fibers that are as free as possible from the ink. This latter suspension is used in the manufacture of new paper.

In practice, in the known "washing" processes, the more dilute suspension containing the possibly greatest quantity of the ink contains a considerable amount of paper fibers and fillers, and the more dilute suspension must thus be suitably treated before being partially recycled or discharged as an effluent. In general, flocculants consisting of polyelectrolytes are added to the suspension which is then subjected to flotation in an acid or neutral medium. See U.S. Pat. No. 3,354,028 to Illingworth. Proceeding in this manner, however, the fibers and mineral fillers are floated together with the ink, thereby causing an important part of the fibers and the mineral fillers to be lost, which otherwise would be useful for the preparation of new paper.

Thus, and summing up, it may be said that with the de-inking compositions of the prior art and with the known de-inking "washing" processes the yield in recovered paper is in general relatively low. See Escher Wyss News, Vol. 44, 1971(1), pages 70 to 79.

Still another drawback of the known "washing" processes is that the floated mass, since it contains a considerable amount of fibers, has a considerable volume and, as such, is difficult to be disposed of.

Moreover, the clarified water obtained downstream of the flotation step may be recycled only in limited quantities to the pulping step and/or to the washing step, because of the considerable electrolyte content caused by pH corrections and flotation salt(s) addition. This causes the drawback of forcing the operator to dispose of large masses of water used in carrying out the overall process. Moreover, if it is desired to recycle part of the clarified acid water, it is necessary to correct the pH with the consequential consumption of reactants because in the pulping and washing steps one works in an alkaline medium.

OBJECTS OF THE INVENTION

Thus, the primary object of this invention is to provide a new composition that, when used in "washing" de-inking processes for printed waste paper, will enable one to de-ink printed waste paper with the production of a pulp having a high brightness in a high yield during the recovery step.

Another object of this invention is to provide a "washing" de-inking process that will enable one, with a limited consumption of reactants and with limited masses of processing water, to recover pulp having a high brightness in a high yield.

SUMMARY OF THE INVENTION

In accordance with this invention, a new de-inking composition has now been found which will enable one readily to achieve the objects indicated above. This new composition consists essentially of:

(A) a salt of a fatty acid of the formula: R—COO—M wherein R represents one or more saturated and/or unsaturated hydrocarbon groups; and (B) a nonionic ethoxylated and/or propoxylated surfactant of the formula:

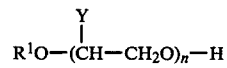

wherein: Y is either H or $CH_3$;

$R^1O$ represents the hydrophobic moiety of the molecule and is derived from a compound selected from the group consisting of alkylphenols of the formula

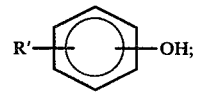

saturated primary fatty alcohols of the formula R"—$CH_2OH$; saturated secondary fatty alcohols of the formula

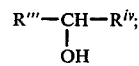

fatty acids of the formula $R^v$—COOH; and mixtures thereof, wherein R', R", R'", $R^{iv}$, and $R^v$ are alkyl groups; and n is a number between 4 and 25;

(C) an anionic surfactant selected from the group consisting of sulphonates of the formula

sulphates of the formula $R^3$—O—$SO_3$—M'; and mixtures thereof, wherein;

$R^2$ is selected from the group consisting of a linear paraffin group, an olefin group, and an alkylaryl group;

$R^3$ is a paraffin group; and $M'$ is selected from the group consisting of Na, K, $NH_4$ and mono-, di-, and tri-substituted alkylamines;

(D) a sodium carboxylmethylcellulose; and (E) an alkaline inorganic salt selected from the group consisting of metasilicate, disilicate, carbonate, borate, and polyphosphates.

The above-indicated compounds are present in the de-inking composition of this invention in the following percentage ranges by weight based upon the entire composition:

| A | 15 | to | 32% |
|---|----|----|-----|
| B | 5  | to | 25% |
| C | 2  | to | 8%  |
| D | 1  | to | 5%  |
| E | 30 | to | 80% | for a total of 100%. These percentages relate to compositions considered as in the pure state.

Component A is practically a soap, that is, an alkaline salt of a fatty acid or, more commonly, of a mixture of fatty acids with hydrocarbon groups R having from 9 to 21 and preferably from 13 to 21 carbon atoms.

Component B is a nonionic ethoxylated and/or propoxylated surfactant whose hydrophobic component $R^1O$ is derived from one or more of the following compounds:

(1)

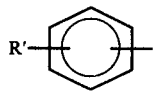

OH alkylphenols in which the alkyl group $R'$ has between 8 and 12 carbon atoms (in this case, thus, $R^1O$ is represented by

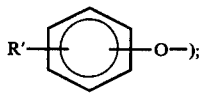

(2) primary saturated fatty alcohols $R''$—$CH_2OH$, in which the alkyl group $R''$ has between 8 and 19 carbon atoms (thus, in this case $R^1O$ is represented by: $R''$—$CH_2$—O);

(3) secondary saturated fatty alcohols

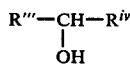

in which the alkyl groups $R'''$ and $R^{iv}$ have an overall carbon atom content of between 8 and 19 carbon atoms (in this case $R^1O$ is thus represented by

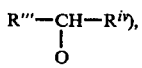

and (4) saturated and/or unsaturated fatty acids $R^v$—COOH, in which the alkyl group $R^v$ has between 9 and 21 carbon atoms (in this case $R^1O$ is represented by $R^v$—COO).

Component C is an anionic surfactant consisting of a sulphonate $R^2$—$SO_3$—$M'$ and/or of a sulphate $R^3$—O—$SO_3$—$M'$. The radical $R^2$ of the sulphonate may consist of:

(a) a linear paraffin group having between 10 and 20 carbon atoms, but preferably between 15 and 18 carbon atoms;

(b) an olefinic group having between 10 and 20 carbon atoms, but preferably between 14 and 18 carbon atoms; or (c) an alkyl aryl group

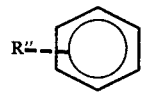

wherein $R''$ is an alkyl group having between 10 and 14 carbon atoms.

The $R^3$ radical of the sulphate is a paraffin chain with a number of carbon atoms between 10 and 20.

Component D is a sodium carboxymethylcellulose wherein the degree of substitution of the sodium carboxymethylene group is between 0.5 and 1, but preferably between 0.6 and 0.8, and the degree of polymerization is between 600 and 1,500, but preferably between 700 and 900.

Component E of the de-inking composition of the present invention is an alkaline inorganic salt selected from the group consisting of metasilicate, disilicate, carbonate, borate, and polyphosphates. Sodium salts are preferred, and in particular sodium metasilicate.

The composition of this invention is prepared by the simple physical mixing together of the components. The composition may be in powder or paste form, depending on the components used and on their proportions. If desired, the five components constituting the composition of this invention may be introduced separately, provided they are in suitable weight ratios to each other, directly into the equipment in which the pulping of the printed waste paper takes place.

The composition of this invention is not toxic; it does not require special precautions for its handling; and it contains anionic and nonionic surfactants that are at least 90% biodegradable.

PREFERRED EMBODIMENT OF THE INVENTION

In a preferred composition, the nonionic surfactant has from 4 to 25, preferably from 5 to 15, repeating ethoxylic units. It is also worthwhile to use sodium metasilicate as the alkaline inorganic salt because it does not require one to use large quantities of sodium hydroxide as is the case when phosphates are used.

It is also advantageous for the weight ratio of components (B) to (C) to be at least 1.1:1 and preferably 2.5:1; the nature of the composition should be in fact more lipophilic than hydrophilic. It is also preferred to have the nonionic surfactant (B) present in an amount of from 10 to 25% by weight.

It has surprisingly been found that when printed waste paper is subjected to a "washing" de-inking process wherein the composition of this invention is used during the pulping step, the suspension of the ink obtained at the end of the pulping step may be effectively subjected to flotation in an alkaline medium without requiring the addition of flocculant. This flotation, by simply blowing in air, occurs in a selective way, i.e., it allows one to remove prevalently the ink.

The "washing" process for de-inking printed waste paper using the composition of this invention consists essentially of the following two steps:

(a) a pulping step wherein the printed waste paper is treated in an alkaline medium with water containing a de-inking agent, in a reactor fitted with a stirring system; and (b) one or more washing steps from which there are obtained two separate suspensions, one containing de-inked paper, the other containing ink, fillers, and paper fibers.

According to this invention the above-mentioned process is characterized in that:

(a) in a pulping step an aqueous suspension containing printed waste paper, present in an amount of 3 to 15% by weight, and the composition according to this invention present in an amount of 1 to 69% by weight with respect to the weight of the printed waste paper, is treated at a pH of 9 to 12;

(b) the suspension containing ink, fillers, and paper fibers, as obtained from the washing, is subjected to flotation at a pH of about 9, by the blowing of air, thereby separating two phases, a thickened phase containing the ink, and the other phase consisting of de-inked clarified water and containing paper fibers and fillers in suspension; and (c) the water clarified from the ink, obtained from the flotation, is totally or partially recycled back to the pulping and the washing steps.

The process may be carried out either in a continuous way or batchwise, with excellent results with any type of printed waste paper (even paper containing many fillers), and with any type of print: daily newspapers (letter-press or offset), illustrated magazines (coated or uncoated), electronic computer tabulations, paper of archives with or without mechanical pulp, trimmings from typographical or from paper-working industries, printed polyethylenized cardboards, etc.

In the practical realization of the "washing" process using the composition of this invention, the pulping is carried out in a conventional pulping apparatus into which water, printed paper, and chemical additives are fed.

The water may be clarified recycled water from the succeeding flotation step, or a mixture of fresh water and recycled water, or just fresh water.

The waste paper is fed in such a way as to obtain a quantity of solids in the water equal to 3 to 15% by weight.

The de-inking composition of this invention is added in quantities of 1 to 6% by weight (preferably 2 to 4%) based upon the weight of the paper being treated. The amount of the composition of the invention to be used depends on the type of paper and on the type of print.

In general, in the pulping step it is preferable to feed initially a part of the water and then, in the given order: de-inking composition, paper, and the remaining water.

When operating batchwise, the pulping is preferably carried out for a period of time between 8 and 35 minutes (usually 10 to 30 minutes), and at a temperature of 30° to 80° C. This temperature may be obtained by the direct heating of the pulping apparatus or by preheating the water. After pulping, the cycle goes on without further heating.

When operating in a batchwise cycle, it is convenient to have the pulping apparatus followed by one or more storage vats which serve to feed successive apparatuses. The dwell time in the storage vats is not critical.

The suspension obtained by the pulping is then conveyed to the successive washing operations that are carried out according to known techniques, using however, in addition to fresh water, possibly also part of the clarified water obtained from the succeeding flotation stage, without any pH corrections, because the cycle remains always in an alkaline medium. The washing operations are carried out in conventional equipment, common to all the installations of this kind.

Usually the washing comprises the so-called screening step and a washing step proper. The screening step is intended to eliminate the heavier and rougher particles (for instance metal staples) as well as the lighter ones (e.g. plastic materials) while the washing step is intended to secure the removal of the ink through the waters and to separate a de-inked paper.

The washing proper consists generally of dilutions followed by countercurrent filterings with water, and is preferably conducted in at least three steps.

The de-inked paper obtained from the washing may be subjected to either an oxidizing or a reducing bleaching according to known techniques.

In the process using the de-inking composition of this invention an oxidizing bleaching with hydrogen peroxide may be conveniently coupled to the pulping step. In this case the pulping is preferably carried out at 50° to 80° C., adding, besides the already-indicated additives, a quantity of hydrogen peroxide equal to 0.5 to 3% by weight, with respect to the weight of the paper, and by maintaining the suspension thus obtained in one or more storage vats for at least 40 minutes. Usually it is advisable to have a dwell time of 40 to 120 minutes, although longer times are equally applicable.

The suspension obtained from the washing contains ink, small-sized cellulose fibers, and fillers. This suspension is conveyed into one or more flotation vats in which the pH is in general maintained at about 9.

In floating by simple blowing of air, and without any flocculant, a selective separation of the ink takes place and the ink is removed by means of the overflowing foam, while the clarified waters containing cellulose fibers and fillers may also be fully recycled to the pulping and washing stages. The total quantity of recycled clarified water and its distribution between the pulping and the washing steps depend on the dilutions that one wishes to obtain respectively in those steps.

Summing up, the advantages of the "washing" process using the de-inking composition of this invention, with respect to the prior art de-inking processes, are the following:

the ability to carry out a selective flotation of the ink and a recycling, which may even be total, of the clarified water containing cellulose fibers, thereby achieving recovery yields of the paper greater than the yields of paper obtained by clarification processes of the waters in an acid medium;

limited masses of water required for the full cycle, due to the ability of recycling the clarified water;

limited masses of slurries and wastes at the outlet of the flotation step; and a smaller consumption of chemical reactants, because amongst others there is avoided the use of flocculants in the flotation bath and correctors of the pH (acids and bases).

Other advantages and characteristics of the composition of this invention will be still more readily understood from the following examples, which are not to be taken, however, as limiting the inventive idea and scope of the invention.

EXAMPLE 1

The de-inking composition used consisted of:

(A) 21% by weight of a sodium salt of fatty acids R—COO—Na, wherein R is represented by the following mixture of hydrocarbon radicals

| | |
|---|---|
| $C_{13}$ | 6% |
| $C_{15}$ | 36% |
| $C_{17}$ | 28% |
| $C_{17}$ (unsaturated) | 2% |
| $C_{19}$ | 16% |
| $C_{21}$ | 12% |

(B) 17% by weight of an ethoxylated, nonionic surfactant of the formula

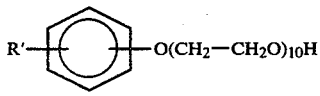

wherein R' is an alkyl group with an average of 9 carbon atoms;

(c) 5% by weight of a sodium linear alkylbenzene-sulphonate in which the alkyl group is represented by the following mixture:

| | |
|---|---|
| $C_{10}$ | 12.4% |
| $C_{11}$ | 37.0% |
| $C_{12}$ | 30.9% |
| $C_{13}$ | 19.7% |

(D) 3% by weight of sodium carboxymethylcellulose with m=0.7 (m=degree of substitution of the sodium-carboxymethylene groups), p=800 (p=degree of polymerization); and (E) 54% by weight of sodium metasilicate.

A mixture of daily newspapers (with an overall filler content of 4% by weight), consisting of 40% letterpress printings and 60% offset printings, was treated with this composition.

Into a 35 m³ pulper, fitted with a rotor on its bottom, there were fed in, in the following order:

10,000 liters of pre-heated water at 35° C.;

44.8 Kg of de-inking composition (equal to 2.8% by weight with respect to the weight of the dry paper);

1,600 Kg of paper; and further water, pre-heated at 35° C., until a total quantity of water of 30,000 kg is attained.

In the pulper the suspension had a solids content of 5% and a pH of about 10. The pulping time was 10 minutes.

The suspension flowing out of the pulper was then passed into a storage vat and from there to the washing stage which consisted of the so-called screening and the washing step.

In the final step of the screening, there was obtained a pulp which was diluted with water until a suspension of 4% solids content and a pH of about 9.5 was obtained, which was then passed to washing.

More particularly, the suspension was subjected to filtering during which it was brought to a consistency of 11%.

Three-quarters (75%) of the water obtained from this filtering step was used for diluting the pulp at the end of the screening.

The pulp was diluted again with water to a concentration of 3.5% and again filtered until a pulp with a consistency of 21% was obtained. The resulting pulp appeared to be de-inked and was thereupon conveyed to the processing line of the paper mill, after having been neutralized to a pH of 6.5 by means of the acid water coming from the continuous paper-producing machine.

The washing waters, containing 1.4 g/lt of fine fibers, fillers, and ink, were conveyed into a flotation vat, into which air was blown from below. Air was also blown into the feeding line of the suspension to be clarified. The pH was about 9, while the dwell time was 2 minutes and 30 seconds.

The outflowing foam, flowing over from the flotation vat, had a 3% by weight solids content prevailingly consisting of ink.

The total volume of waste material at the outlet of the flotation vat corresponded to 4.4% of the total volume at the inlet.

The liquid at the outlet of the flotation vat, free of colored pigments and containing fibers and fillers, was recycled, with 16% going to the pulping step and the remainder to the dilution stages of the paste which were necessary for screening and washing. All the water fed into the pulper came from this recycle.

The de-inked paste obtained from the washing contained 1,488 kg of paper fibers (dry weight). The recovery yield was 93%.

The 112 kg of missing material consisted partly (24 kg) of inks, fillers, and fibers flowing out with the foams overflowing from the flotation vat, and partly (88 kg) of heavy and light foreign bodies, fibers, and colored pigments which are then eliminated during the screening.

The brightness, measured with an ELREPHO apparatus on the de-inked pulp thus obtained, was about 54 degrees. The mean of the brightness values measured on the unprinted borders of the starting newspapers was about 56 degrees.

The brightness measurement carried out on a sheet of paper prepared from the starting paper mixture as such (that is, not de-inked) was about 42 degrees.

The reclaimed pulp may, if desired, by subjected to a bleaching treatment with hydrogen peroxide, according to techniques well known in the art, downstream of the de-inking treatment of this invention.

EXAMPLE 2

The process of Example 1 was repeated, except that in the first step of the treatment in the pulper a bleaching with hydrogen peroxide was simultaneously carried out.

Practically, in addition to the de-inking composition, there were added 1.2% by weight of hydrogen peroxide, expressed as pure product, and calculated with respect to the dry weight of the starting paper.

The operational pulper temperature was brought up to 60° C., while the dwell time in the storage vat was about 1 hour. All the other operational procedures remained the same as in Example 1.

The recovery yield of the paper turned out to be 93%, while the brightness of the obtained paste was about 63 degrees.

EXAMPLE 3

In this example a mixture of waste paper (with an overall filler content of 15% by weight) was treated, consisting of 50% letter-press dailies and 50% illustrated magazines. Of these latter, 50% were coated paper and 50% were uncoated.

The cycle was carried out following the same procedure as in Example 1, thereby obtaining a recovery yield for the paper of 90%.

The brightness measured on the obtained de-inked paste was about 62 degrees. The mean of the brightness values measured on the unprinted borders of the starting newspapers was about 63 degrees.

The brightness measurement carried out on a sheet of paper prepared from the starting not de-inked paper mixture was about 54 degrees.

EXAMPLE 4

Example 3 was repeated, but combining it with a bleaching operation like the one used in Example 2.

The recovery yield of the paper amounted to 90% while the brightness measured on the obtained pulp turned out to be 73 degrees.

EXAMPLE 5

Example 2, was repeated on a mixture of printed waste paper consisting 100% of chemical pulp, essentially consisting of electronic computer tabulations.

The recovery yield of the paper was 95%, while the reflectance index of the obtained de-inked pulp was 82 degrees. The mean of the brightness measurements, carried out on the unprinted borders of the starting papers, was 81 degrees. The brightness measured on a sheet of paper prepared from the non de-inked starting paper, was 69 degrees.

EXAMPLE 6

Example 1 was repeated except that the de-inking composition was used in a quantity corresponding to 3.5% by weight with respect to the dry weight of the paper. The recovery yield amounted to 93% and the reflectance index of the de-inked pulp was about 55 degrees.

EXAMPLE 7

Example 1 was repeated using a de-inking composition consistng of:

(A) 18% by weight of the sodium salt of fatty acids described in example 1.

(B) 15% by weight of an ethoxylated, nonionic surfactant of the formula $$R'—COO(CH_2—CH_2O)_5H$$

wherein the starting fatty acid is represented by hydrogenated tallow.

(C) 5% by weight of the linear sodium alkylbenezenesulphonate described in example 1.

(D) 3% by weight of the sodium carboxymethylcellulose described in example 1.

(E) 59% by weight of sodium metasilicate.

The recovery yield was 93% and the brightness measured with an ELREPHO apparatus on the de-inked pulp obtained, was about 54 degrees.

EXAMPLE 8

Example 1 was repeated using a de-inking composition consisting of:

(A) 30% by weight of the sodium salt of fatty acids described in example 1.

(B) 11% by weight of an ethoxylated, nonionic surfactant of the formula:

$$R''—O—(CH_2—CH_2O)_{25}—H$$

wherein R'' is a linear alkyl group with an average of 16 carbon atoms; also FIG. 25 for the ethoxylic units represents an average value;

(C) 4% by weight of the linear sodium alkylbenzenesulphonate described in example 1.

(D) 2% by weight of the sodium carboxymethylcellulose described in example 1.

(E) 53% by weight of sodium metasilicate.

The recovery yield was 94.5% and the brightness measured with an ELREPHO apparatus on the de-inked pulp obtained, was about 55 degrees.

Although the degree of brightness were quite satisfactory, the presence of 25 moles of ethylene oxide gave rise to the formation of small agglomerates of ink and it was hard to remove such agglomerates.

EXAMPLE 9

Example 1 was repeated using a de-inking composition consisting of (A) 20% by weight of the soap described in example 1;

(B) 20% by weight of the ethoxylated alkylphenol of example 1, in which however the number of the ethoxylic units has been changed to 15;

(C) 8% by weight of the alkylbenzenesulphonate described in example 1;

(D) 5% by weight of the sodium carboxymethyl-cellulose described in example 1;

(E) 47% by weight of meta silicate.

The recovery was very satisfactory and the brightness was about 52.5 degrees.

No formation of ink agglomerates was observed.

What is claimed is:

1. A de-inking composition consisting essentially of:

(A) a salt of a fatty acid of the formula $$R—COO—M$$

wherein R represents one or more saturated and/or unsaturated hydrocarbon groups having from 9 to 21 carbon atoms, and wherein M is Na or K, said fatty acid salt being present in an amount between 15% and 32% with respect to the weight of the entire composition;

(B) a non-ionic surfactant consisting of an ethoxylated fatty alcohol of the formula:

$$R_1O—(CH_2—CH_2O)_n—H$$

wherein $R_1O$ represents the hydrophobic portion of the molecule and is derived from a primary or secondary fatty alcohol of the formula $$R''CH_2OH \text{ or } R'''—\underset{OH}{CH}—R''''$$

wherein R'', R''', and R'''' are alkyl groups and n is a number between 4 and 25;

said non-ionic surfactant being present in an amount of about 10% to about 25% by weight, based upon the entire composition, the weight ratio between said one-ionic surfactant and the anionic surfactant (C) hereinafter being at least 2.5:1, the nature of the composition being more lipophilic than hydrophilic;

(C) an anionic surfactant selected from the group consisting of sulphonates of the formula $R^2$—SO$_3$—M';

sulphates of the formula $R^3$—O—SO$_3$—M';

and mixtures thereof, wherein;

$R^2$ is selected from the group consisting of a linear paraffin group, an olefin group, and an alkylaryl group;

$R^3$ is a paraffin group; and

M' is selected from the group consisting of Na, K, NH$_4$ and mono-, di-, tri-substituted alkylamines;

said anionic surfactant being present in an amount between 2% and 8% with respect to the weight of the entire composition;

(D) a sodium carboxylmethylcellulose present in an amount between 1% and 5% with respect to the weight of the entire composition; and (E) an alkaline inorganic salt selected from the group consisting of metasilicate, disilicate, carbonate, borate, and polyphosphates, said alkaline inorganic salt present in an amount between 30% and 80% with respect to the weight of the entire composition; the percentages of the components (A), (B), (C), (D), and (E) totaling essentially 100%.

2. The de-inking composition of claim 1 wherein the radical R of said salt of a fatty acid has from 13 to 21 carbon atoms.

3. The composition of claim 1 wherein n is 25.

4. The de-inking composition of claim 1 wherein the radical $R^2$ of the anionic surfactant consisting of a sulphonate of the formula $R^2$—SO$_3$—M' is an alkylaryl

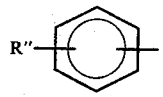

group wherein R'' is a linear alkyl group having between 10 and 14 carbon atoms.

5. The de-inking composition of claim 1 wherein the sodium carboxymethylcellulose had a degree of substitution of the sodium carboxymethylene groups between 0.5 and 1 while the degree of polymerization is between 600 and 1500.

6. A composition for de-inking printed waste paper by the "washing" process, said composition containing:

from 0.15 to 1.92% by weight, with respect to the weight of the printed waste paper, of the sodium salt of a fatty acid;

from 0.05 to 1.5% by weight, with respect to the weight of the printed waste paper, of a non-ionic surfactant consisting of an ethoxylated fatty alcohol of the formula:

$R_1O$—$(CH_2$—$CH_2O)_n$—H wherein $R_1O$ represents the hydrophobic portion of the molecule and is derived from a primary or secondary fatty alcohol of the formula:

R''CH$_2$OH or R'''—CH—R''''
|
OH wherein R'', R''', and R'''' are alkyl groups, and n is a number between 4 and 25;

from 0.02 to 0.48% by weight, with respect to the weight of the printed waste paper, of an alkylarylsulfonate, with the provision that the weight ratio between said non-ionic surfactant and said alkylaryl sulfonate is at least 2.5:1, the nature of the composition being more lipophilic than hydrophilic;

from 0.01 to 0.30% by weight, with respect to the weight of the printed waste paper, of sodium carboxymethylcellulose; and from 0.30 to 4.8% by weight, with respect to the weight of the printed waste paper, of an alkaline inorganic salt selected from the group consisting of metasilicate, disilicate, carbonate, borate, and polyphosphate salts.

* * * * *